Oct. 25, 1949.    R. LININGTON    2,486,301
HOPPER TRAP

Filed Nov. 14, 1945    2 Sheets-Sheet 1

INVENTOR.
Reuben Linington,
BY Victor J. Evans & Co.
ATTORNEYS

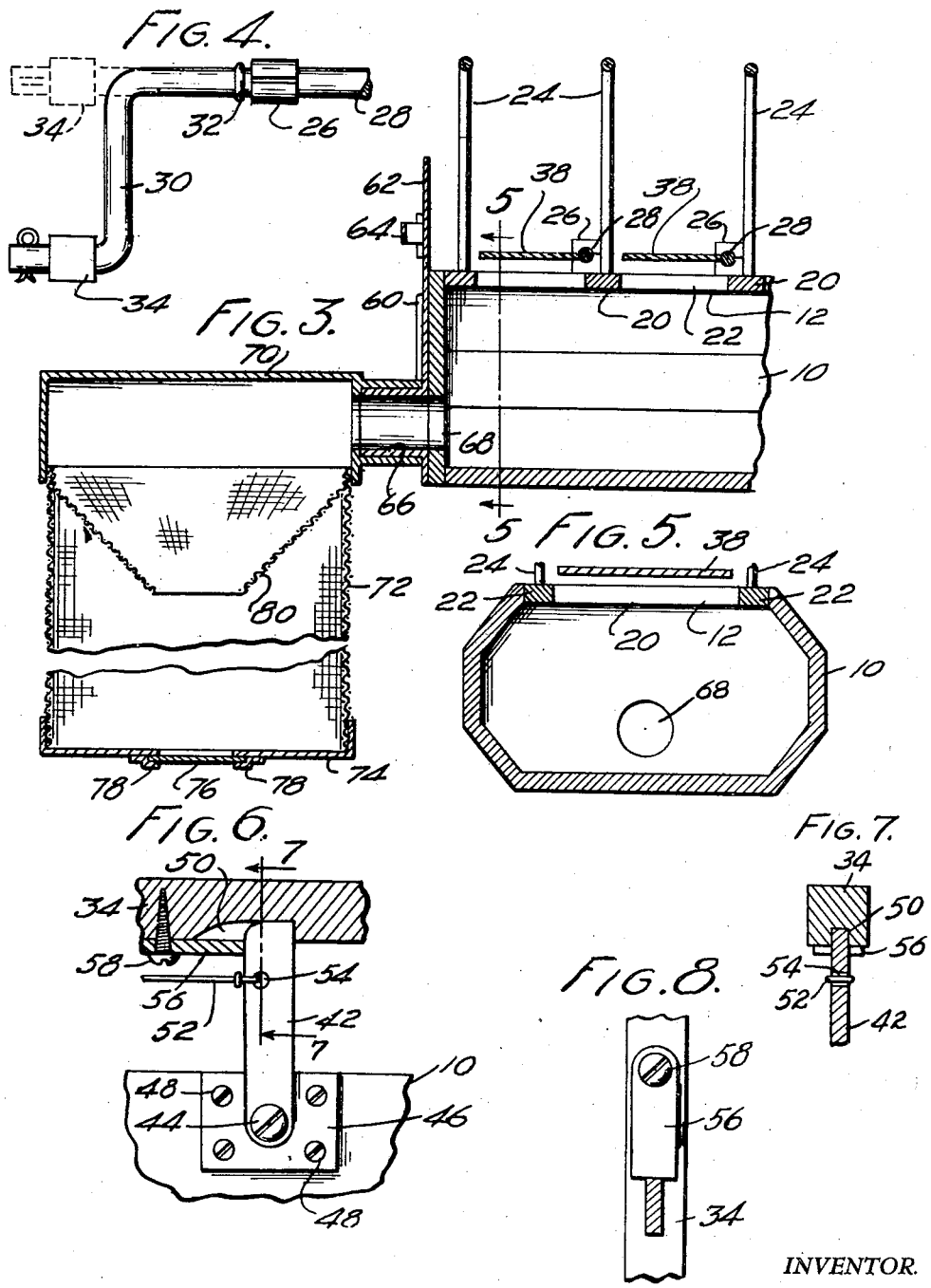

Patented Oct. 25, 1949

2,486,301

UNITED STATES PATENT OFFICE 2,486,301

HOPPER TRAP

Reuben Linington, Bellemead, N. J.

Application November 14, 1945, Serial No. 628,390

3 Claims. (Cl. 43—61)

This invention relates to a hopper trap for rodents, and more especially to a trap that is adapted to be placed on a hopper for the purpose of catching rodents eating the feed in the hopper. The trap being operated when the chickens are not eating, and inoperative when the chickens are eating so that the chickens will not be caught in the trap.

An object of this invention therefore is to provide a trap in combination with a feeding hopper or trough which will trap rodents therein when said hopper or trough is not being used for feeding purposes.

Another object of the invention is to provide a device which can be manually operated by remote control from any desired distance.

With the above and other objects and advantages in view, the invention consists of the novel details of construction, arrangement and combination of parts more fully hereinafter described, claimed and illustrated in the accompanying drawings, in which:

Figure 3 is a fragmentary enlarged sectional view of the end of the device and the wire basket for catching the rodents, taken approximately on the line 3—3 of Fig. 1 and showing the door in raised position;

Figure 4 is an enlarged fragmentary view of the crank arm showing in full the position the arm will assume when the trap members are in horizontal position and in dotted lines when the trap members are in vertical position;

Figure 5 is a sectional view on the line 5—5 of Figure 3;

Figure 6 is an enlarged fragmentary view of the trip lever;

Figure 7 is a sectional view on the line 7—7 of Figure 6; and

Figure 8 is a bottom view of the safety catch for the trip lever.

Figure 1:
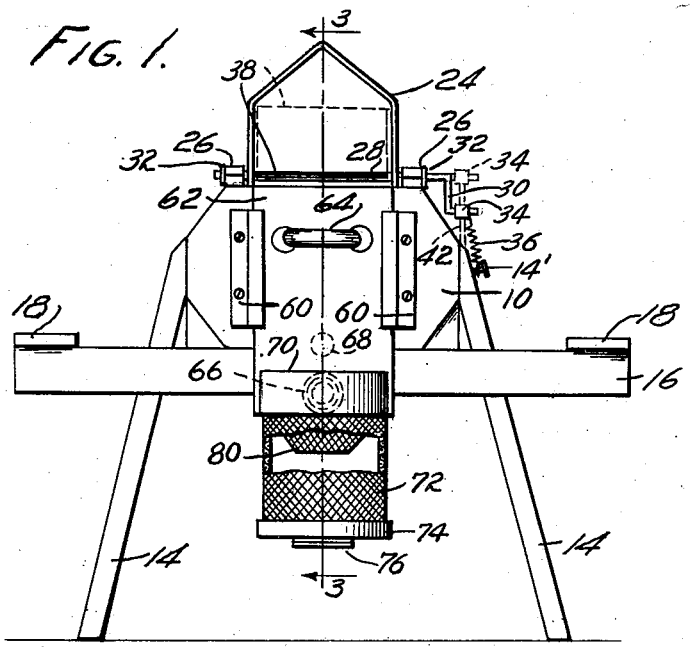
Figure 1 is an end view of an embodiment of the invention with the door in lowered position and showing in dotted lines the operative position of the trap.

Referring more in detail to the drawing, the reference numeral 10 designates the feed hopper which is octagonal in cross section and provided with the open top 12 for convenience in feeding poultry.

The hopper 10 is provided with inclined diametrically opposed legs 14 which are secured to the hopper 10 adjacent the ends thereof and transversely extending roost supports 16 are secured to the bottom of the hopper 10 intermediate the legs 14 and the ends of the hopper 10.

Secured to the supports 16 and extending in longitudinal parallel relationship with the hopper 10 are the roosts 18 for the poultry.

Extending transversely of the hopper 10 are the cross members 20 which are secured to the longitudinal members 22 and form the frame for supporting the trap and guard assembly. Secured to the members 20 are the guards 24 which separate the poultry during the feeding thereof and secured to the members 20 and welded to the guards 24 are the diametrically opposed split bearings 26, which rotatably receive the shafts 28, having crank arms 30 on one end thereof.

The shafts 28 are swaged at 32 to retain said shafts in position in the bearings 26.

The crank arms are mounted in the longitudinally extending operating bar 34 which is parallel to the hopper 10 and springs 36 secured at one end to the bar 34 by means of the openings 34' therein, and at the opposite end to the legs 14 by means of the fasteners 14', urge the bar 34 forward which, in turn, will urge the trap members 38 downwardly to engage the top of the hopper 10. The members 38 are made of sheet material and are welded to the shafts 28 for movement therewith. A stop 40 on the end of the bar 34 engaging the end of the hopper 10 prevents and limits the movement of the bar into set position. To prevent the bar 34 from urging the members 38 into engagement with the hopper 10, a trip lever 42, pivotally mounted by the pin 44 on a plate 46 secured to the hopper 10 by fasteners 48, engages in the slot or groove 50 in the bar 34 and a rope 52 secured in the opening 54 in the lever 42 will actuate the lever 42 and trap the rodents in the hopper 10. A safety catch 56 horizontally pivoted on the pin 58 on the bar 34 prevents actuation of the trap during the day when the poultry are using the hopper 10 for feeding purposes.

The end of the hopper 10 is provided with diametrically opposed vertical trackways 60 in which is slidably mounted a door 62 having a handle 64 thereon for the manipulation thereof.

Figure 2:
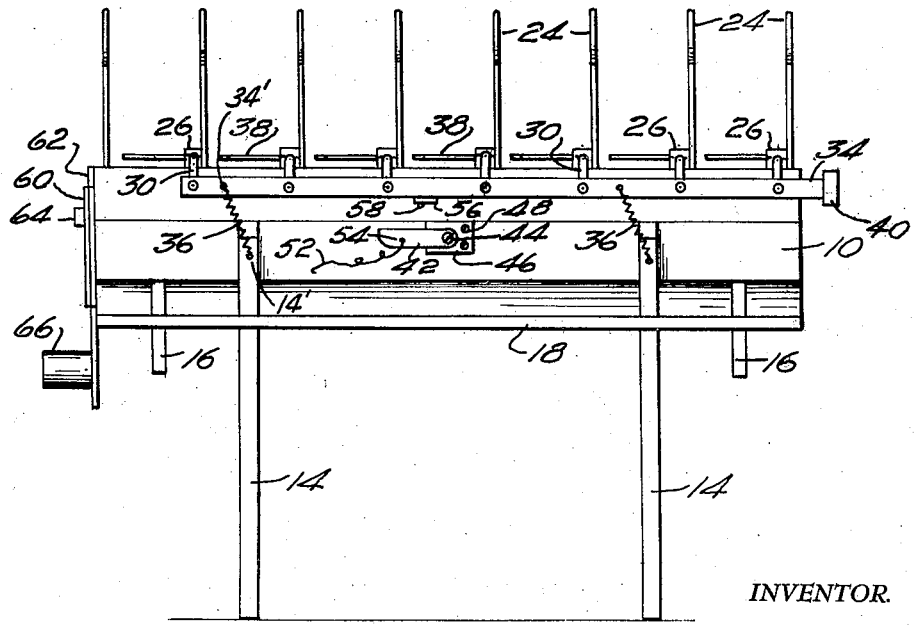
Figure 2 is a side elevation thereof.

The door 62 is provided with a neck 66 which co-acts with the opening 68 in the end of the hopper as seen in Figure 3 or will close the opening 68 when the door is in the position shown in Figure 2. The neck 66 is adapted to receive the tripper portion 70 of the basket 72 and the lower portion 74 is provided with a trap door 76 slidably mounted in diametrically opposed trackways 78 secured to the bottom or lower portion 74 of the basket 72.

The basket 72 is provided with a depending conical entrance 80 which is provided to prevent the rodents trapped therein from leaving the basket and the basket may be submerged in water to drown the rodents.

In operation, the trap members 38 are placed in vertical position and the bar 34 is positioned in set position and retained therein by the top lever 42 which can be operated at a remote distance by the rope 52 to close the hopper 10 and hold the rats therein until they exit into the basket 72 wherein they are removed for drowning. After the rodents are drowned, they may be removed from the basket 72 by the trap door 76.

It is believed the operation and construction of the device will be clear to those skilled in the art and it is to be understood that minor changes in the details of construction, arrangement or combination of parts may be resorted to without departing from the spirit of the invention or the scope of the appended claims.

Having thus described the invention, what is claimed as new, and desired to be secured by Letters Patent is:

1. A device of the character described, in combination with a feeding hopper, comprising a frame adapted to be positioned on said hopper, guard members secured to said frame in vertical relation thereto, trap members pivoted to said frame intermediate of said guard members, means coacting with said trap members to latch said trap members in set position, and means coacting with said trap members for the release thereof from set position into trap position.

2. The invention as in claim 1, wherein said frame comprises longitudinally extending parallel members spaced from each other by transverse members.

3. The invention as in claim 1, wherein shafts having crank arms are secured to said frame and said trap members are secured to said shafts and the means coacting with said trap members to latch said members in set position comprises a longitudinally extending bar connected to said crank arms and a pivoted latch member coacting with said bar to retain it in set position, and the means coacting with the trap members for the release thereof comprises a pivoted latch member adapted to engage said first latch member in bar engaging position.

REUBEN LININGTON.

REFERENCES CITED

The following references are of record in the file of this patent:

UNITED STATES PATENTS

| Number | Name | Date |
|---|---|---|
| 49,923 | Rex | Sept. 12, 1865 |
| 818,357 | Davis | Apr. 17, 1906 |
| 1,469,961 | Rood | Oct. 9, 1923 |
| 1,795,712 | Cone | Mar. 10, 1931 |
| 2,321,877 | Troyer | June 15, 1943 |

FOREIGN PATENTS

| Number | Country | Date |
|---|---|---|
| 135,315 | Great Britain | Nov. 27, 1919 |